Patented Feb. 23, 1926.

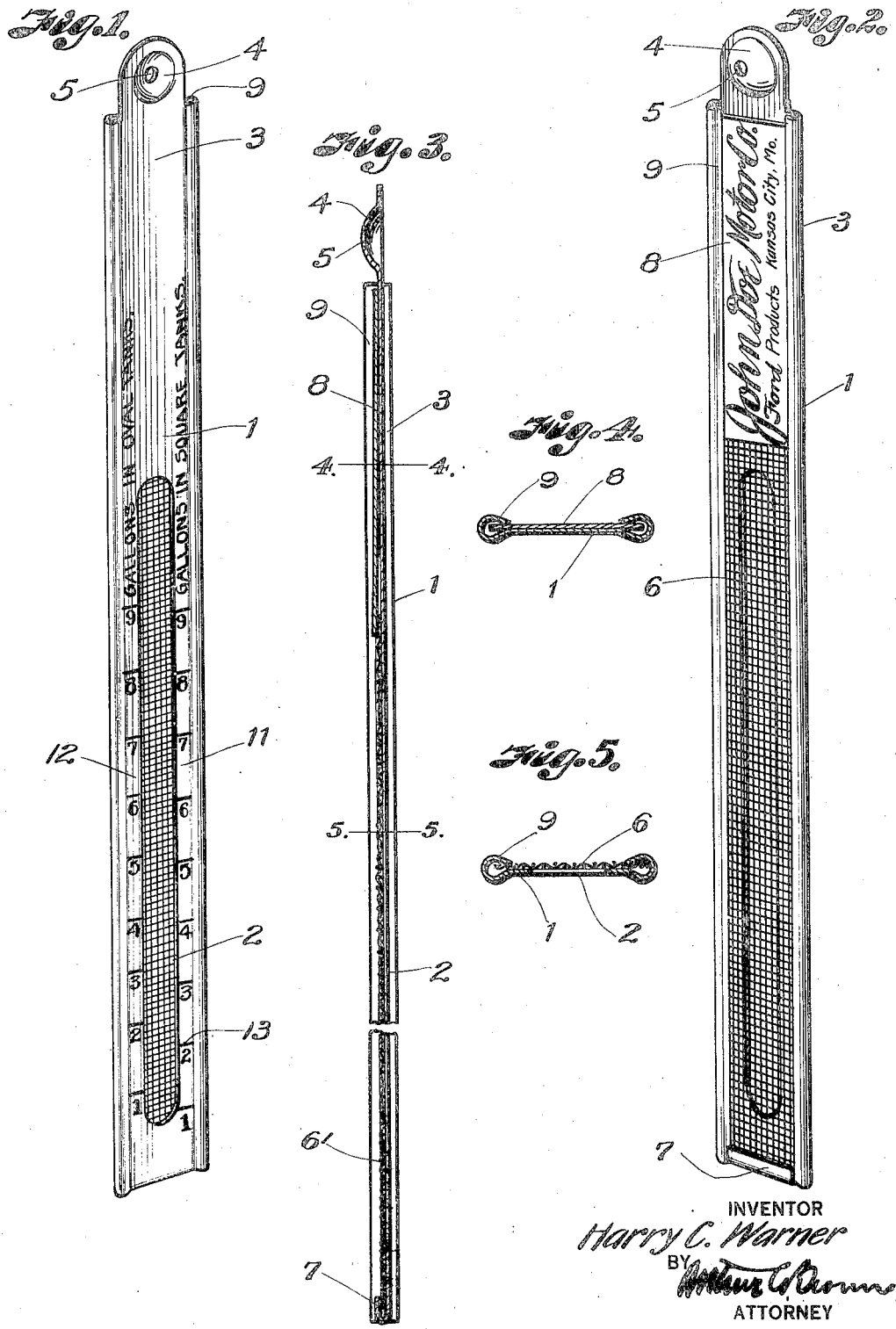

1,574,267

UNITED STATES PATENT OFFICE.

HARRY C. WARNER, OF KANSAS CITY, MISSOURI, ASSIGNOR TO WARNER HARDWARE SPECIALTY COMPANY, OF KANSAS CITY, MISSOURI, A CORPORATION OF MISSOURI.

LIQUID-DEPTH GAUGE.

Application filed August 22, 1925. Serial No. 51,840.

*To all whom it may concern:*

Be it known that I, HARRY C. WARNER, a citizen of the United States, residing at Kansas City, in the county of Jackson and State of Missouri, have invented certain new and useful Improvements in Liquid-Depth Gauges; and I do declare the following to be a full, clear, and exact description of the invention, such as will enable others skilled in the art to which it appertains to make and use the same, reference being had to the accompanying drawings, and to the figures of reference marked thereon, which form a part of this application.

My invention relates to a liquid depth gauge, and more particularly to a device of that character for measuring the depth of gasoline in the tank of a motor vehicle, the principal object of the present invention being to provide a gauge which will distinctly indicate the depth of liquid after each application of it into the tank.

In accomplishing this object, I have provided improved details of structure, the preferred forms of which are illustrated in the accompanying drawings, wherein Fig. 1 is a perspective view of a liquid depth gauge constructed in accordance with my invention.

Fig. 2 is a similar view of the opposite side of the gauge.

Fig. 3 is a longitudinal section of the gauge.

Fig. 4 is a transverse section on the line 4—4, Fig. 3.

Fig. 5 is a transverse section on the line 5—5, Fig. 3.

Referring more in detail to the drawings, 1 designates a frame or body member consisting of a rectangular strip of sheet metal having a longitudinal slot 2 extending from near its butt end to a point spaced from the opposite end to provide a handle portion 3, preferably provided with a finger hold 4 having an aperture 5 whereby the gauge may be suspended from a hook or nail.

Lying along one face of the frame or body strip 1 is a perforate strip 6 of wire gauze, preferably of 16 gauge, in order that it may carry liquid in its mesh after removal from a tank, and through which light may pass.

In order that a liquid carrying portion of the wire may be easily distinguished from the remainder of the strip, and the quantity of liquid determined from reading of the scale at the line of demarcation, the wire is preferably coated with flat black paint, to provide an unglazed surface to which the liquid will readily adhere and to avoid light reflection which might interfere with proper observation of the liquid line.

The butt end of the gauze strip is held to the frame by a lip 7 formed integrally with the frame strips, and back lapped over the end of the gauze strip. At the handle end a keeper strip 8, of substantially the same width as the gauze strip, overlaps the handle end of the gauze strip to cover the rough edge thereof, and which may, if desired, bear advertising matter.

Both the gauze strip and keeper strip are held to the frame throughout their lengths by lips 9, formed integrally with the frame strip and back lapped over the longitudinal edges of the gauze strip and keeper strip, thereby not only holding the last named strip securely in place, but covering the raw edges of the wire gauze. The rails 11, 12 at the sides of the slot 2 on the face of the frame opposite the gauze strip 6 are provided with scale lines 13 arranged to indicate the quantity of liquid in a particular size of tank.

In Fig. 1 of the drawings I have shown the gauge adapted for a tank of a particular make of motor vehicle employing both square and round cornered tanks, and have arranged the scale markings on the side rail 11 for indicating the volume of liquid in the square tank, and those on the rail 12 for indicating contents of the round corner form, the markings on the rail 11 being lower than those on the rail 12 for the reason that the bottom capacity of one is greater than that of the other. This, however, is a customary arrangement and no novelty is claimed for it.

In using the device;

When the volume of liquid in a tank is to be gauged, the filling cap of the tank is removed and the gauge projected into the tank vertically until the butt end engages the bottom of the tank. The gauge is then removed and held to the light. Liquid will have adhered to the wire gauze to a depth corresponding to the depth of liquid in the tank, and the line of demarcation between the liquid containing section of the gauze and that section above the line is easily discernible. Following the line of demarcation to the scale along the edge of the frame slot, the user can instantly read the quantity of liquid remaining in the tank from the figures on the scale. With the wire gauze coated with a flat black paint, the liquid will readily adhere to the unglazed surface of the wire, and the dull surface above the liquid level is readily distinguished from the liquid carrying part.

If there is any uncertainty in the reading, the liquid can be easily removed from the gauze by flipping the gauge, and a new reading taken.

What I claim and desire to secure by Letters Patent is:—

1. A liquid gauge comprising a frame strip having a longitudinal slot, a perforate strip applied to one face of the frame strip and covering the slot, and a keeper strip overlapping one end of the perforate strip, the frame strip having edge lips back lapped over the edges of the perforate strip and the keeper strip, and having an end lip back lapped over the end of the perforate strip opposite the keeper strip to hold the perforate strip and the keeper strip in place.

2. A liquid gauge comprising a metallic frame strip slotted longitudinally from near its butt end, and having lips back lapped from its longitudinal edges and butt end, a strip of black, flat-coated wire gauze held to one face of the frame strip by said back lapped lips and covering the slot in the frame strip, the opposite side of the frame strip bearing scale markings at the edges of said strip adjacent the slot.

In testimony whereof I affix my signature.

HARRY C. WARNER.